(12) United States Patent
Lee et al.

(10) Patent No.: US 7,649,857 B2
(45) Date of Patent: Jan. 19, 2010

(54) METHOD AND APPARATUS FOR ESTABLISHING RADIO BEARER FOR POINT-TO-MULTIPOINT MULTIMEDIA SERVICE IN MOBILE COMMUNICATION SYSTEM

(75) Inventors: Young Dae Lee, Kyoungki-do (KR); Seung June Yi, Seoul (KR); Sung Duck Chun, Anyang (KR)

(73) Assignee: LG Electronics Inc., Seoul (KR)

( * ) Notice: Subject to any disclaimer, the term of this patent is extended or adjusted under 35 U.S.C. 154(b) by 810 days.

(21) Appl. No.: 10/947,024

(22) Filed: Sep. 21, 2004

(65) Prior Publication Data

US 2005/0068963 A1    Mar. 31, 2005

(30) Foreign Application Priority Data

Sep. 29, 2003    (KR) .................. 10-2003-0067517

(51) Int. Cl.
H04H 20/71    (2008.01)
(52) U.S. Cl. .................. 370/312; 370/432; 455/436
(58) Field of Classification Search .............. 370/312, 370/315, 319–321, 328, 331, 335–337, 342–345, 370/347, 432, 441, 442, 478–480, 498; 455/436–439, 455/442, 443
See application file for complete search history.

(56) References Cited

U.S. PATENT DOCUMENTS 7,206,596 B2 * 4/2007 Nishio .................. 455/522
7,266,372 B2 * 9/2007 Moon et al. .............. 455/422.1
7,499,435 B2 * 3/2009 Kwak et al. .................. 370/337
2003/0231612 A1 * 12/2003 Kim et al. .................... 370/342

FOREIGN PATENT DOCUMENTS

| EP | 0 928 119 A3 | 5/2000 |
| EP | 1 077 539 B1 | 6/2004 |
| RU | 2157598 | 10/2000 |

OTHER PUBLICATIONS

Koga, et al. "Radio link configurations of broadband wireless access system." 1999 IEEE International Conference on Personal Wireless Communication, 1999.

* cited by examiner

Primary Examiner—Donald L Mills
(74) Attorney, Agent, or Firm—Lee, Hong, Degerman, Kang & Waimey

(57) ABSTRACT

A method and apparatus for establishing a radio bearer of a point-to-multipoint multimedia service by utilizing a reference configuration of radio bearer parameters for quickly establishing a radio bearer when a mobile terminal moves between cells. By configuring radio bearer parameters for a specific point-to-multipoint service by utilizing a reference configuration such that the same, or equal value, protocol and channel parameters are set for each cell, different cells in a communication system in which a specific point-to-point service is provided are able to configure the radio protocol entities, channels, and radio bearer at the same time by utilizing the same parameter values, thereby minimizing delay in establishing a radio bearer and minimizing data loss occurring during handover, conserving network resources, and enhancing reception performance via soft combining.

23 Claims, 7 Drawing Sheets

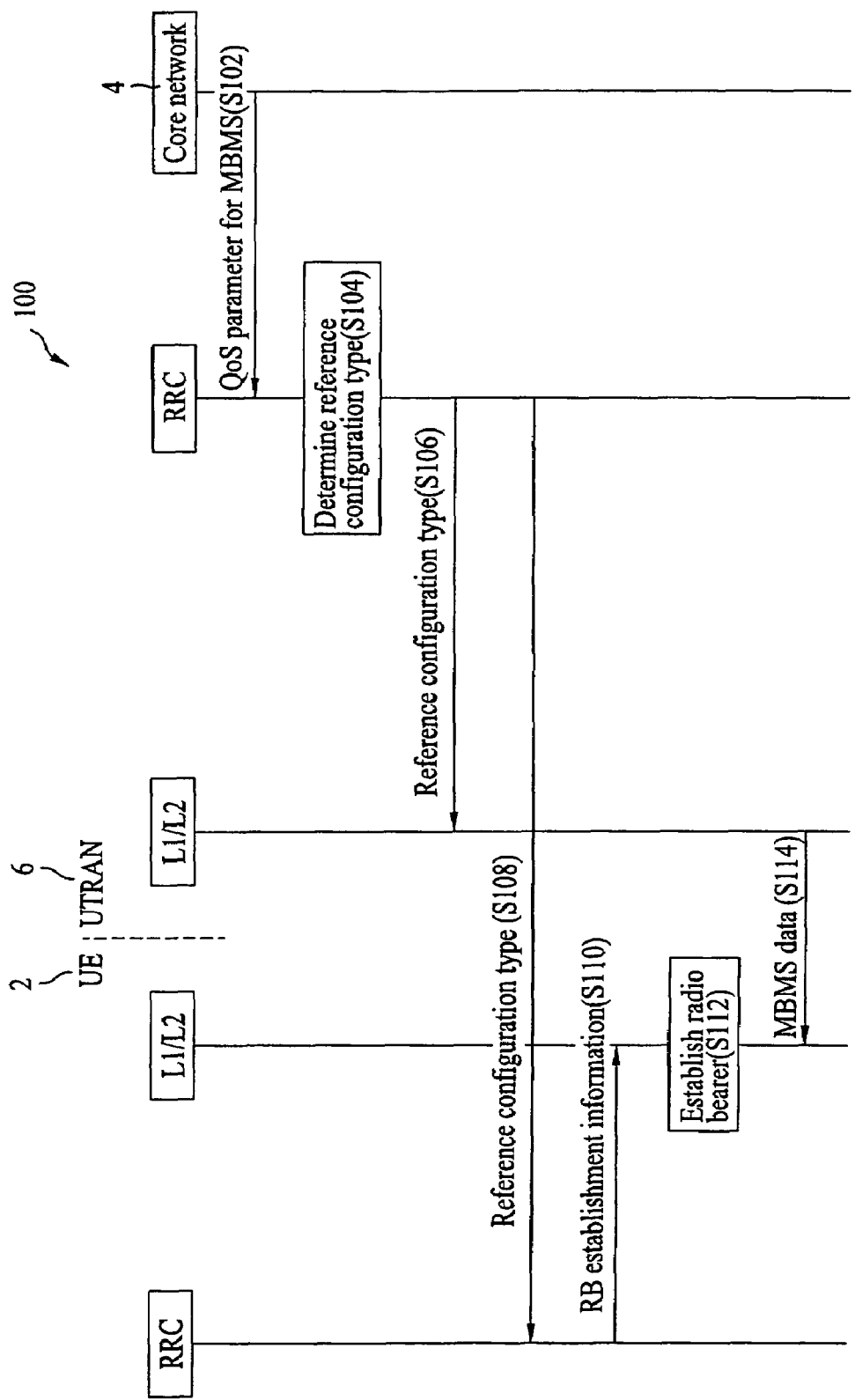

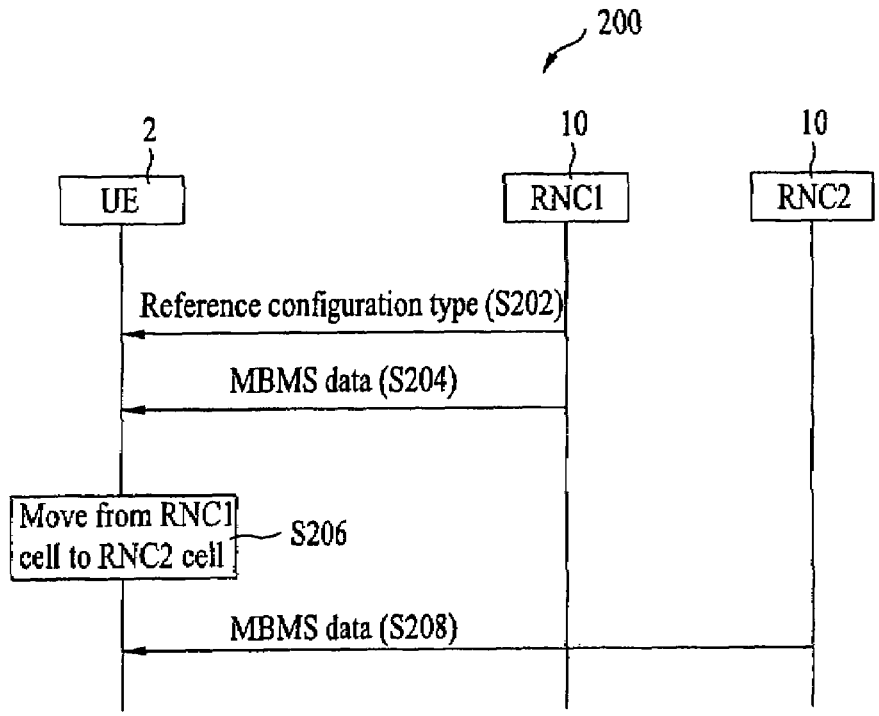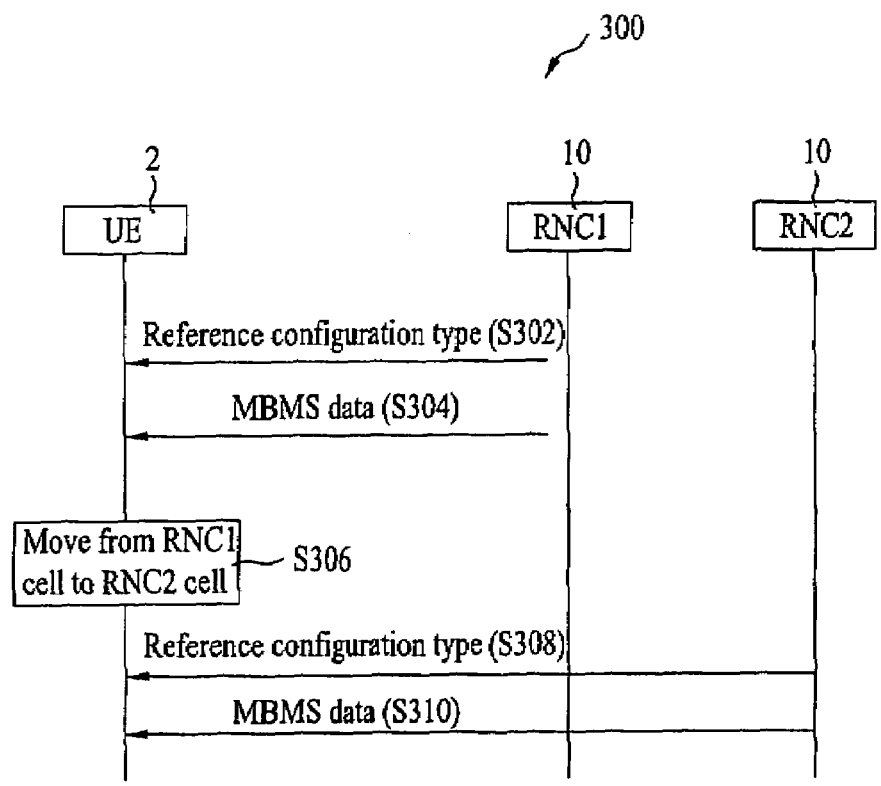

METHOD AND APPARATUS FOR ESTABLISHING RADIO BEARER FOR POINT-TO-MULTIPOINT MULTIMEDIA SERVICE IN MOBILE COMMUNICATION SYSTEM

CROSS-REFERENCE TO RELATED APPLICATIONS

This application claims the benefit of the Korean Application No. 10-2003-0067517 filed on Sep. 29, 2003, which is hereby incorporated by reference.

BACKGROUND OF THE INVENTION

1. Field of the Invention

The present invention relates to a radio broadcast/multicast service provided in a universal mobile telecommunications system (UMTS), and more particularly, to a method and apparatus for establishing a radio bearer of a point-to-multipoint multimedia service by utilizing a reference configuration of radio bearer parameters, for example protocol parameters and channel parameters, for quickly establishing a radio bearer when a user equipment (UE) moves between cells.

2. Discussion of the Related Art

The universal mobile telecommunications system (UMTS) is a third-generation mobile communications system evolving from the global system for mobile communications system that is the European standard. The UMTS is aimed at providing enhanced mobile communications services based on the GSM core network and wideband code-division multiple-access technologies.

A conventional UMTS network structure 1 is illustrated in FIG. 1. One mobile terminal 2, or user equipment (UE), is connected to a core network 4 through a UMTS terrestrial radio access network (UTRAN) 6. The UTRAN 6 configures, maintains, and manages a radio access bearer for communications between the UE 2 and core network 4 to meet end-to-end quality-of-service requirements.

The UTRAN 6 includes a plurality of radio network subsystems 8, each of which comprises one radio network controller (RNC) 10 and a plurality of base stations 12, or "Node Bs." The RNC 10 connected to a given base station 12 is the controlling RNC for allocating and managing the common resources provided for any number of UEs 2 operating in one cell. The controlling RNC 10 controls traffic load, cell congestion, and the acceptance of new radio links. Each Node B 12 may receive an uplink signal from a UE 2 and may transmit downlink signals to the UE. Each Node B 12 serves as an access point enabling a UE 2 to connect to the UTRAN 6, while an RNC 10 serves as an access point for connecting the corresponding Node Bs to the core network 4.

Among the radio network subsystems 8 of the UTRAN 6, the serving RNC 10 is the RNC managing dedicated radio resources for the provision of services to a specific UE 2 and is the access point to the core network 4 for data transfer of the specific UE. All other RNCs 10 connected to the UE 2 are drift RNCs, such that there is only one serving RNC connecting the UE to the core network 4 via the UTRAN 6. The drift RNCs 10 facilitate the routing of user data and allocate codes as common resources.

The interface between the UE 2 and UTRAN 6 is realized through a radio interface protocol established in accordance with 3GPP radio access network specifications describing a physical layer (L1), a data link layer (L2), and a network layer (L3). A control plane is provided for carrying control information for the maintenance and management of the interface and a user plane is provided for carrying data traffic such as voice signals and Internet protocol packet transmissions. The conventional architecture of the radio interface protocol is illustrated in FIG. 2.

The physical (PHY) layer provides information transfer service to a higher layer and is linked via transport channels to a medium access control (MAC) layer. The MAC layer includes a MAC-b entity, a MAC-d entity, and a MAC-c/sh entity.

The MAC-b entity manages the broadcast channel as a transport channel responsible for the broadcasting of system information. The MAC-c/sh entity manages common transport channels shared with other UEs 2 within the cell, for example the forward access channel and downlink shared channel, such that one MAC-c/sh entity exists for each cell and is located at the controlling RNC 10. Therefore, each UE 2 has one MAC-c/sh entity. The MAC-d entity manages a dedicated transport channel with respect to a specific UE 2 such that the MAC-d entity is located at the serving RNC 10 and each UE also has one MAC-d entity.

To provide a point-to-point service, such as a multimedia broadcast/multicast service (MBMS), in accordance with a conventional method of the present invention, an MBMS function is appended to the functions of the MAC-c/sh layer, thereby creating a MAC-c/sh/m layer. There is one MAC-c/sh/m layer per cell in the UTRAN 6 and one MAC-c/sh/m layer per UE.

A radio link control (RLC) layer supports the transmission of reliable data and is responsible for the segmentation and concatenation of RLC service data units delivered from a higher layer. The size of the RLC service data unit is adjusted for the processing capacity in the RLC layer and a header is appended to form an RLC protocol data unit for delivery to the MAC layer.

The formed units of service data and protocol data delivered from the higher layer are stored in an RLC buffer of the RLC layer. The RLC services are used by service-specific protocol layers on the user plane, namely a broadcast/multicast control (BMC) protocol and a packet data convergence protocol (PDCP), and are used by a radio resource control (RRC) layer for signaling transport on the control plane.

The BMC layer schedules a cell broadcast message delivered from the core network 4 and enables the cell broadcast message to be broadcast to the corresponding UEs 2 in the appropriate cell. Header information, such as a message identification, a serial number, and a coding scheme, is added to the cell broadcast message to generate a broadcast/multicast control message for delivery to the RLC layer.

The RLC layer appends RLC header information to the broadcast/multicast control message and transmits the message to the MAC layer via a common traffic channel as a logical channel. The MAC layer maps the common traffic channel to a forward access channel as a transport channel. The transport channel is mapped to a secondary common control physical channel as a physical channel.

The PDCP layer transfers data efficiently over a radio interface having a relatively small bandwidth. The PDCP layer uses a network protocol such as IPv4 or IPv6 and a header compression technique for eliminating unnecessary control information utilized in a wire network. The PDCP layer enhances transmission efficiency since only the information essential to the header is included in the transfer.

The RRC layer handles the control plane signaling of the network layer (L3) between the UEs 2 and the UTRAN 6 and controls the transport and physical channels for the establishment, reconfiguration, and release of radio bearers. A radio bearer is a service provided by a lower layer, such as the RLC layer or MAC layer, for data transfer between the UE 2 and UTRAN 6 in order to guarantee a predetermined quality of service by the UE 2 and UTRAN 6.

Establishment of a radio bearer determines the regulating characteristics of the protocol layer and channel needed to provide a specific service, thereby establishing the parameters and operational methods of the service. When a connection is established to allow transmission of messages between an RRC layer of a specific UE 2 and an RRC layer of the UTRAN 6, the UE is said to be in the RRC-connected state. Without such connection, the UE 2 is in an idle state.

An MBMS provides a streaming or background service to a plurality of UEs 2 using a downlink only MBMS radio bearer. In the UTRAN 6, an MBMS may utilize a point-to-multipoint or point-to-point radio bearer.

In the MBMS broadcast mode, multimedia data is transmitted to all UEs 2 within a broadcast area, for example the domain where the broadcast service is available. In the MBMS multicast mode, multimedia data for a specific UE group is transmitted within a multicast area, for example the domain where the multicast service is available.

An MBMS requires the support of two logical channels; an MBMS control channel (MCCH), which is a point-to-multi point downlink channel for transmitting MBMS control information to UEs 2, and an MBMS traffic channel (MTCH), which is a point-to-multi point downlink channel for transmitting MBMS data to UEs. One MCCH channel exists in each cell, and one MTCH channel exists for each specific MBMS within a specific cell. Both logical channels are mapped to a transport channel (FACH) and a secondary common control physical channel (S-CCPCH).

FIG. 3 illustrates a conventional MTCH protocol in which an RNC 10 configuration has two Node Bs 12, with one managing three cells and another managing one cell. Each cell has separately configured radio bearer parameters for every PHY, RLC, and PDCP entity per MTCH channel per MBMS in the UTRAN 6 side. The same entities are similarly established in the UE side 2 (not shown).

In the conventional method, however, the UTRAN 6 independently configures and reconfigures radio bearer parameters for each cell. Therefore, despite providing the same service, the radio bearer parameter values may be configured differently, whereby protocol entities and channels may operate differently. Since a UE 2 needs to configure new protocol parameters whenever moving to another cell, there may be an undesirable delay before a radio bearer is newly established, during which time the UE has no radio bearer and thus receives no MBMS data. Data loss may occur when a UE 2 moves to a new cell and the UE is unable to achieve soft combining gain in which values from various cells are combined during a soft handover.

Therefore, there is a need for a method and apparatus for enabling a mobile terminal that moves between cells to reconfigure protocol parameters without data loss and to achieve soft combining gain via a soft handover. The present invention addresses these and other needs.

SUMMARY OF THE INVENTION

The present invention is directed to a method and apparatus for configuring radio bearer parameters by utilizing a reference configuration. Specifically, the invention is directed to a method and apparatus that configures radio bearer parameters for a specific point-to-multipoint service by utilizing a reference configuration such that the same, or equal value, protocol and channel parameters are set for each cell.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method and apparatus that provides information to a mobile terminal regarding the reference configuration utilized by a network to provide a specific point-to-multipoint service. When the mobile terminal moves to a different cell, informing the mobile terminal of the new reference configuration may identify the parameters necessary to continue receiving the specific point-to-multipoint service.

In one aspect of the present invention, a method is provided for receiving a point-to-multipoint service in a mobile terminal. The method includes utilizing first data communication parameters associated with a first configuration type identifier for the point-to-multipoint service, receiving a second configuration type identifier associated with second data communication parameters for the same point-to-multipoint service, comparing the first configuration type identifier with the second configuration type identifier and utilizing the first data communication parameters to receive the point-to-multipoint service if the first configuration type identifier and the second configuration type identifier are identical.

It is contemplated that the first and second data communication parameters may each include channel parameters for configuring channels necessary for receiving the point-to-multipoint service. It is further contemplated that the first and second data communication parameters may each include protocol parameters for configuring protocol entities necessary for receiving the point-to-multipoint service. In a preferred embodiment, the method also includes utilizing the second data communication parameters associated with the second configuration type identifier to receive the point-to-multipoint service if the first configuration type identifier and the second configuration type identifier are not identical.

The first data communication parameters and the second data communication parameters may be pre-loaded in the mobile terminal. Alternately, the first data communication parameters and the second data communication parameters may be received from a network.

If the first data communication parameters and the second data communication parameters are received from a network, they may be received via a dedicated channel or a common channel. It is contemplated that the first data communication parameters and the second data communication parameters may be received repeatedly and periodically via a common channel.

It is contemplated that the first configuration type identifier may be received via a common channel. It is further contemplated that the second configuration type identifier may be received via a common channel. Preferably, the first configuration type identifier is related to a first cell and the second configuration type identifier is related to a second cell when a mobile terminal moves from the first cell to the second cell.

In another aspect of the present invention, a method is provided for receiving a point-to-multipoint service in a mobile terminal. The method includes storing sets of data communication parameters with each set of parameters having a corresponding stored configuration type identifier, receiving a configuration type identifier for the point-to-multipoint service, retrieving the set of data communication parameters associated with the received configuration type identifier and utilizing the retrieved set of data communication parameters to receive the point-to-multipoint service.

It is contemplated that the configuration type identifier may be received via a common control channel. It is further contemplated that the method may include receiving a point-to-multipoint service identifier corresponding to the received configuration type identifier.

Preferably, the point-to-multipoint service is a packet data service. It is contemplated that the mobile terminal may not transmit any response upon receiving the configuration type identifier.

It is contemplated that the sets of data communication parameters may be associated with a common traffic channel for receiving the point-to-multipoint service. It is further contemplated that more than one set of data communication parameters may be utilized simultaneously.

The sets of data communication parameters and corresponding configuration type identifiers may be pre-loaded in the mobile terminal. Alternately, the sets of data communication parameters and corresponding configuration type identifiers may be received from a network.

In another aspect of the present invention, a method is provided for providing a point-to-multipoint service to one or more mobile terminals. The method includes utilizing first data communication parameters associated with a first configuration type identifier to transmit the point-to-multipoint service to the mobile terminals and transmitting a second configuration type identifier associated with second data communication parameters for the same point-to-multipoint service to the mobile terminals.

It is contemplated that the first data communication parameters and second data communication parameters may each include channel parameters for configuring channels necessary for receiving the point-to-multipoint service. It is further contemplated that the first data communication parameters and second data communication parameters may each include protocol parameters for configuring protocol entities necessary for receiving the point-to-multipoint service. In a preferred embodiment, the method also includes utilizing the second data communication parameters associated with the second configuration type identifier to transmit the point-to-multipoint service to the mobile terminals.

The method may include transmitting the first data communication parameters and the second data communication parameters to the mobile terminals. The first data communication parameters and the second data communication parameters may be transmitted via a dedicated channel or via a common channel. It is contemplated that the first data communication parameters and the second data communication parameters may be transmitted repeatedly and periodically via a common channel.

It is contemplated that the first configuration type identifier may be transmitted via a common channel. It is further contemplated that the second configuration type identifier may be transmitted via a common channel.

In another aspect of the present invention, a method is provided for providing a point-to-multipoint service to one or more mobile terminals. The method includes storing sets of data communication parameters with each set of parameters having a corresponding stored configuration type identifier, transmitting a configuration type identifier for the point-to-multipoint service to the mobile terminals, retrieving the set of data communication parameters associated with the transmitted configuration type identifier and utilizing the retrieved set of data communication parameters to transmit the point-to-multipoint service to the mobile terminals.

It is contemplated that the configuration type identifier may be transmitted via a common control channel. It is further contemplated that the method may include transmitting a point-to-multipoint service identifier corresponding to the transmitted configuration type identifier.

It is contemplated that the sets of data communication parameters may be associated with a common traffic channel for transmitting the point-to-multipoint service. It is further contemplated that a plurality of point-to-multipoint services may be transmitted simultaneously to the mobile terminals utilizing more than one set of data communication parameters. Preferably, the point-to-multipoint service is a packet data service.

The sets of data communication parameters and corresponding configuration type identifiers may be pre-loaded in a network. The method may include transmitting the sets of data communication parameters and corresponding configuration type identifiers to the mobile terminals.

In another aspect of the present invention, a mobile communication device is provided for receiving a point-to-multipoint service. The mobile communication device includes an RF module, an antenna, a keypad, a display, a storage unit and a processing unit.

The RF module and antenna receive configuration type identifiers. The keypad allows a user to enter information. The display conveys information to a user. The storage unit stores the configuration type identifiers and associated data communication parameters. The processing unit performs the methods of the present invention to utilize first data communication parameters for the point-to-multipoint service associated with a first configuration type identifier, process a second configuration type identifier associated with second data communication parameters for the point-to-multipoint service, compare the first configuration type identifier with the second configuration type identifier, and utilize the first data communication parameters to receive the point-to-multipoint service if the first configuration type identifier and the second configuration type identifier are identical. If the first configuration type identifier and the second configuration type identifier are not identical, the processing unit may utilize the second data communication parameters associated with the second configuration type identifier to receive the point-to-multipoint service.

In another aspect of the present invention, a mobile communication device is provided for receiving a point-to-multipoint service. The mobile communication device includes an RF module, an antenna, a keypad a display, a storage unit, and a processing unit.

The RF module and antenna receive configuration type identifiers. The keypad allows a user to enter information. The display conveys information to a user. The storage unit stores sets of data communication parameters and corresponding configuration type identifiers. The processing unit performs the methods of the present invention to process a configuration type identifier for the point-to-multipoint service, retrieve the set of stored data communication parameters associated with the received configuration type identifier and utilize the retrieved set of data communication parameters to receive the point-to-multipoint service.

In another aspect of the present invention, a network is provided for providing a point-to-multipoint service to a mobile terminal. The network includes a transmitter, a receiver, and a controller.

The transmitter transmits a configuration type identifier and associated data communication parameters to one or more mobile terminals. The receiver receives information from the mobile terminals. The controller performs the methods of the present invention to utilize first data communication parameters associated with a first configuration type identifier to provide the point-to-multipoint service to the mobile terminals and transmit a second configuration type identifier associated with second data communication parameters for the same point-to-multipoint service to the mobile terminals.

In another aspect of the present invention, a network is provided for providing a service to a mobile terminal. The network includes a transmitter, a receiver and a controller.

The transmitter transmits a configuration type identifier and associated data communication parameters to one or more mobile terminals. The receiver receives information from the mobile terminals. The controller performs the methods of the present invention to store sets of data communication parameters and corresponding configuration type identifiers, transmit a configuration type identifier for the point-to-multipoint service to the mobile terminals, retrieve the set of stored data communication parameters associated with the transmitted configuration type identifier, and utilize the retrieved set of data communication parameters to transmit the point-to-multipoint service to the mobile terminals.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 illustrates a method for establishing a radio bearer for a point-to-multipoint service according to the present invention.

FIG. 5 illustrates a first embodiment of the method of FIG. 4 applied during handover of a mobile terminal.

FIG. 6 illustrates a second embodiment of the method of FIG. 4 applied during handover of a mobile terminal.

DETAILED DESCRIPTION OF THE INVENTION

Figure 1:
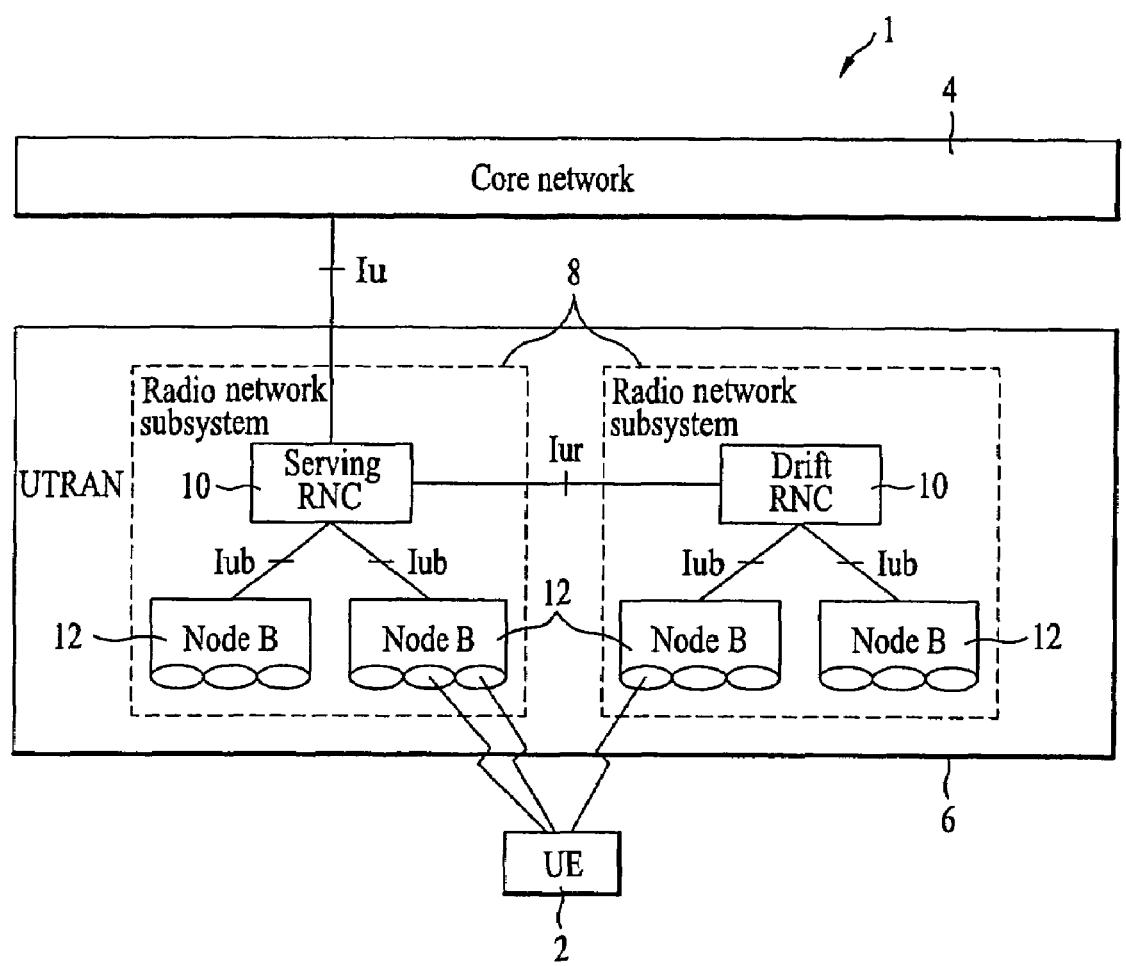
FIG. 1 illustrates a block diagram of a conventional UMTS network structure.
Figure 2:
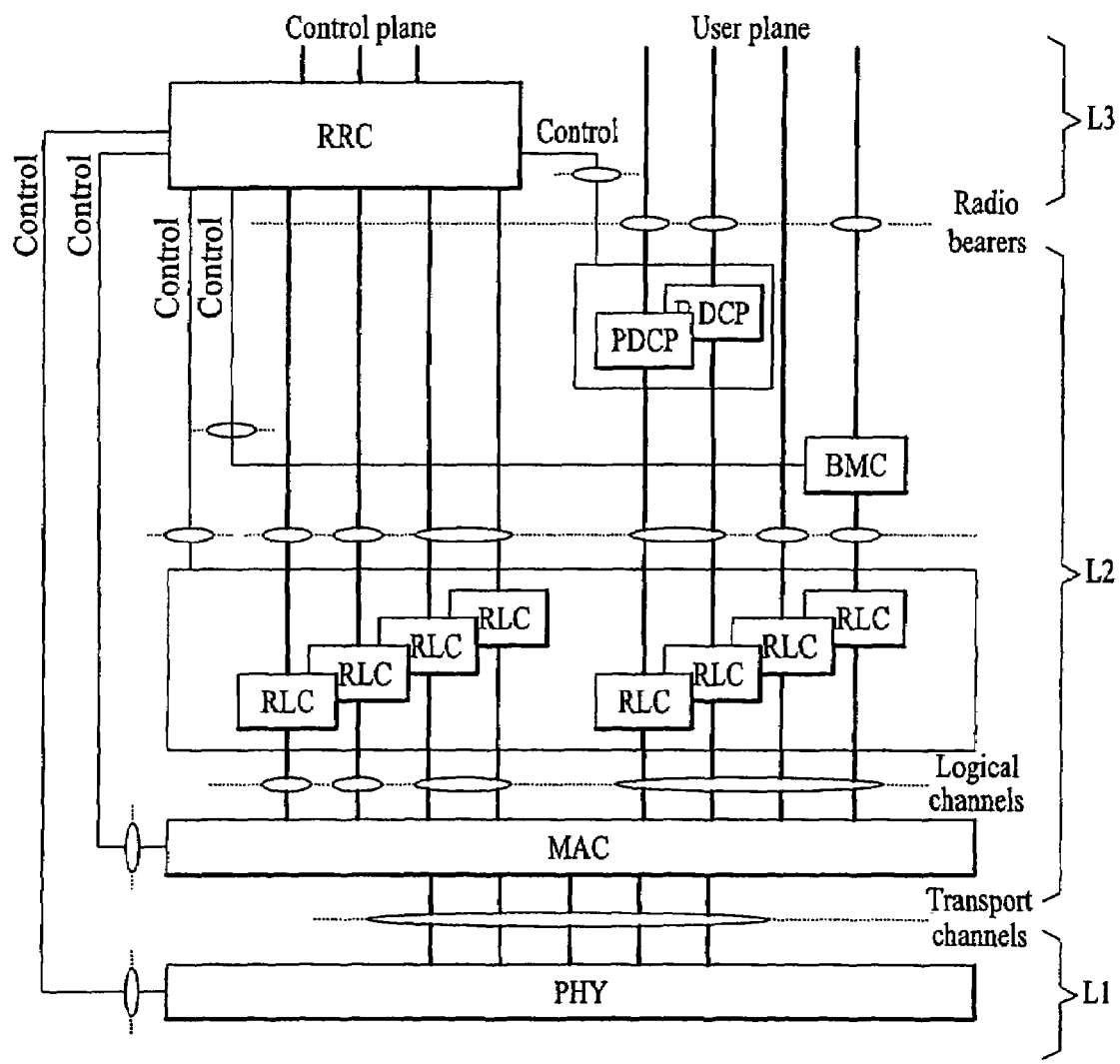
FIG. 2 illustrates a block diagram of the architecture of a conventional radio interface protocol based on 3GPP radio access network specifications.
Figure 3:
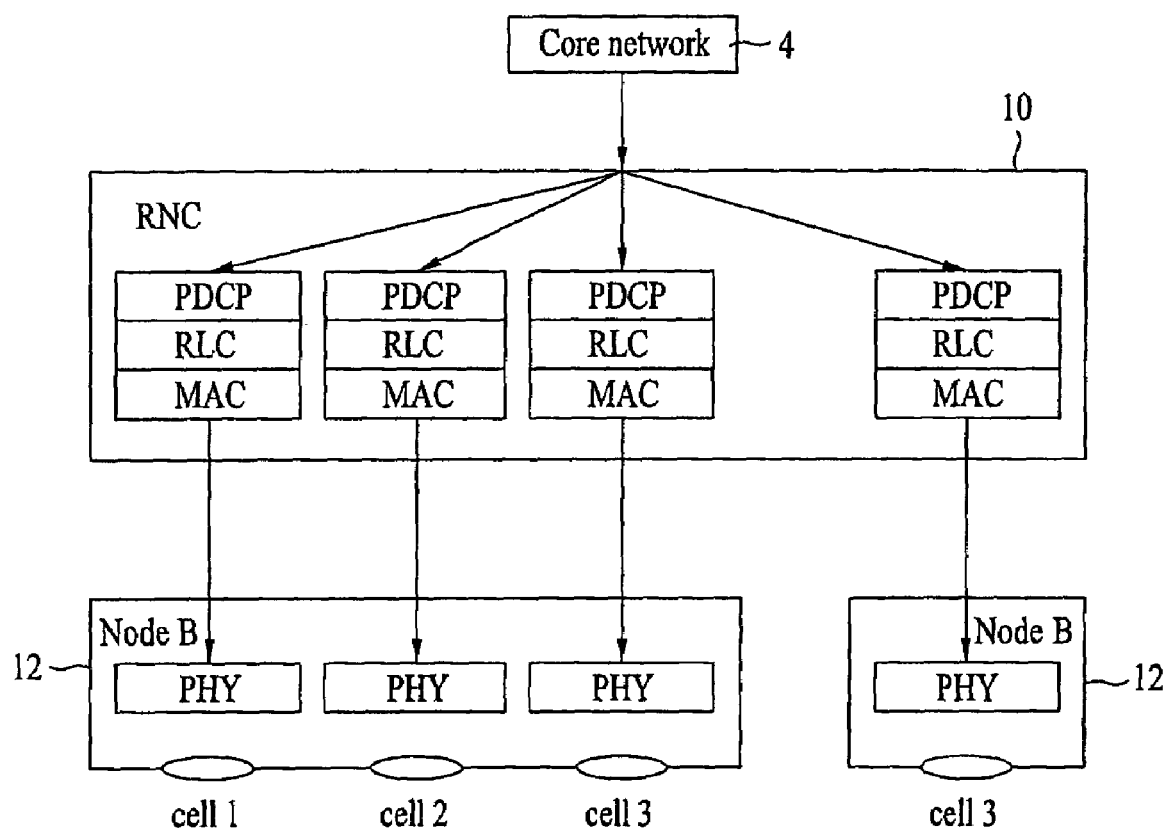
FIG. 3 illustrates a block diagram of a conventional MTCH protocol architecture.

The present invention is directed to a method and apparatus for configuring radio bearer parameters for a specific point-to-multipoint service, for example an MBMS, provided in a mobile communication system, such as UMTS, by setting the same, or equal value, protocol parameters and channel parameters for each cell. Although the present invention is illustrated with respect to a mobile terminal in a UMTS, it is contemplated that the present invention may be utilized anytime it is desired to configure radio bearer parameters for a specific point-to-multipoint service provided in a mobile communication system such that the same protocol parameters and channel parameters are utilized for providing the service in each cell of the system.

Reference will now be made in detail to the preferred embodiments of the present invention, examples of which are illustrated in the accompanying drawings. Wherever possible, the same reference numbers will be used throughout the drawings to refer to the same or like parts.

To configure radio bearer parameters according to the present invention, the UTRAN 6 preferably defines a reference configuration, which is a set of specific values of protocol and channel parameters utilized for at least one MBMS transfer.

To provide more than one MBMS, the UTRAN 6 defines a plurality of reference configuration types with each type including one set of configuration values, for example protocol parameters and channel parameters, which define the reference configuration type. Therefore, different reference configuration types will have different configuration values.

To provide a specific MBMS, the UTRAN 6 preferably selects one reference configuration type and configures protocol entities and logical/transport/physical channels necessary for transmitting the MBMS data using the corresponding configuration values, for example protocol and channel parameters. The UTRAN 6 informs a plurality of UEs 2 desiring to receive the MBMS of the selected reference configuration type. A UE 2 configures its protocol entities and channels according to the configuration values of the protocol and channel parameters corresponding to the selected reference configuration type.

According to the present invention, the protocol entities are radio interface protocols of the L2 layer, including the PDCP, RLC, and MAC sublayers, and the channels include logical, transport, and physical channels. Therefore, the configuration values of the protocol and channel parameters corresponding to the indicated configuration type may include parameter values of the PDCP, RLC, and MAC sublayers and parameter values of the logical, transport, and physical channels.

FIG. 4 illustrates a method 100 for establishing a radio bearer for an MBMS according to the present invention. In FIG. 4, the UE 2 represents one of a plurality of UEs desiring to receive the MBMS, preferably a UE having joined the MBMS.

A core network 4 transfers quality of service (QoS) information to the UTRAN 6 (S102). The QoS information is transferred to the UTRAN 6 from the serving GPRS support node (SGSN) of the core network and includes at least one QoS parameter supporting an MBMS. The RRC layer of the UTRAN 6 determines a reference configuration type supporting the QoS information parameter (S104).

The RRC layer of the UTRAN 6 informs an L1/L2 protocol entity of the UTRAN of the determined reference configuration type in order to enable a radio bearer to be established (S106). Information indicative of the reference configuration type includes radio bearer establishment information for providing the specific MBMS. The RRC layer of the UTRAN 6 also transmits the reference configuration type information to the RRC layer of a UE 2 (S108) by multicasting/broadcasting the information to a plurality of UEs. Each UE 2 receives reference configuration type information for the MBMS or services it has joined.

The RRC layer of the UE 2 recognizes the reference configuration type from the received reference configuration type information and transfers the radio bearer establishment information to the L1/L2 protocol entity of the UE (S110).

The L1/L2 protocol entity of the UE 2 establishes a radio bearer according to the received radio bearer establishment information. The L1/L2 protocol entity of the UTRAN 6 transmits MBMS data to the UE 2 via the established radio bearer (S114).

It is assumed that the UTRAN 6 and UE 2 have both acquired reference configuration information, such as the available reference configuration types and their parameters, prior to executing the steps of the method 100 illustrated in FIG. 4. A UE 2 may acquire the reference configuration according to one of three schemes, with the reference configuration stored in the UE for future use. The UE 2 acquires information indicative of the corresponding reference configuration type from the reference configuration information and, once the reference configuration type information is stored in the UE, there is no need for the UE to receive such information again unless the UTRAN 6 changes the reference configuration type.

In a first scheme, reference configuration types and the values of corresponding parameters are prestored in the UE 2, for example by the UE manufacturer. In a second scheme, reference configuration types and the values of corresponding parameters are transmitted from the UTRAN 6 directly to a specific UE 2 prior to use and are stored in the UE for future use. In a third scheme, reference configuration types and the values of corresponding parameters are multicast or broadcast, preferably repeatedly and periodically, by the UTRAN 6 to the UEs 2 in a cell or cells prior to use and are stored in the UEs for future use.

FIG. 5 illustrates a first embodiment 200 of the method of FIG. 4 performed during handover of a UE 2. In FIG. 5, it is assumed that the handover occurs between cells utilizing the same reference configuration type for the same service. Therefore, for a given service, the protocol and channel parameters of the respective cells are each set to the same values.

As illustrated In FIG. 5, the UE 2 moves from a first cell managed by a first RNC (RNC1) 10, where the UE initially receives the MBMS, to second cell managed by a second RNC (RNC2). The embodiment illustrated in FIG. 5 is also applicable when the UE 2 moves between cells managed by the same RNC 10.

While located in the first cell managed by RNC1, the UE 2 receives a reference configuration type corresponding to a specific MBMS from RNC1 (S202). According to the received reference configuration type and internally referenced data, for example from a lookup table stored in the UE 2 containing data previously acquired by one of the aforementioned three schemes, the UE establishes an MBMS radio bearer and receives the MBMS data (S204).

Thereafter, the UE 2 moves from the first cell managed by RNC1 to a second cell managed by RNC2 (S206). While located in the second cell managed by RNC2, the UE 2 continues to receive MBMS data using the radio bearer established in the previous cell (S208).

When utilizing the same reference configuration type for the same service, one service identifier identifying a specific MBMS is mapped to one specific reference configuration type. Each RNC 10 determines the same reference configuration type for a specific MBMS by one of three processes.

In a first process, the RNC 10 directs each cell to utilize the same reference configuration type. This process is applicable to every cell of the same Node B 12 and to every cell of the same RNC 10, where all cells are managed by the same RNC in a core network 4, enabling the corresponding RNC to utilize the same reference configuration type.

In a second process, the SGSN of a core network 4 directs each cell to utilize the same reference configuration type. This process is applicable to every cell of the same Node B 12, to every cell of the same RNC 10, and to every cell of the same SGSN in a core network 4, where all cells are connected to the same SGSN, which enables the directed RNCs 10 to utilize the same reference configuration type.

In a third process, a network provider, for example an operator, directs each cell to use the same reference configuration type. Therefore, the same reference configuration type is utilized for all cells managed by the network provider.

The above processes may also be applied if the reference configuration type for the MBMS is to be changed. Preferably, each cell providing the specific MBMS utilizing the same reference configuration type changes the reference configuration type of the corresponding MBMS at the same time. In the present invention, the cells intending to provide a specific MBMS utilizing the same reference configuration type should make the determination and change the corresponding type at the same time. Changing the reference configuration type includes changing the radio bearer parameters, for example protocol parameters and channel parameters.

If all the cells cannot use the same reference configuration type for a specific MBMS, the embodiment 300 illustrated in FIG. 6 is applicable. FIG. 6 illustrates a second embodiment 300 of the method of FIG. 4 performed during handover of a UE 2.

In FIG. 6, it is assumed that the handover occurs between cells using different reference configuration types for the same service. Therefore, it is assumed that a reference configuration type configured by a first RNC 10 for the service is different from that configured by a second RNC for the same service. The embodiment 300 illustrated in FIG. 6 is also applicable to movement of a UE 2 between cells managed by the same RNC 10.

While located in a first cell managed by a first RNC (RNC1) 10, the UE 2 receives a reference configuration type corresponding to a specific MBMS from RNC1 (S302). According to the received reference configuration type and internally referenced data, for example from a lookup table stored in the UE 2 containing data previously acquired by one of the aforementioned three schemes, the UE establishes an MBMS radio bearer and receives the MBMS data (S304).

Thereafter, the UE 2 moves from the first cell managed by RNC1 to a second cell managed by RNC2 (S306). To continue receiving the MBMS data while located in the second cell managed by RNC2, the UE receives information indicating a reference configuration type for the MBMS from RNC2 (S308). As in step S304, the UE 2 uses the received information and internally referenced data to recognize the reference configuration type, establish a radio bearer, and receive the MBMS data (S310).

Figure 7:
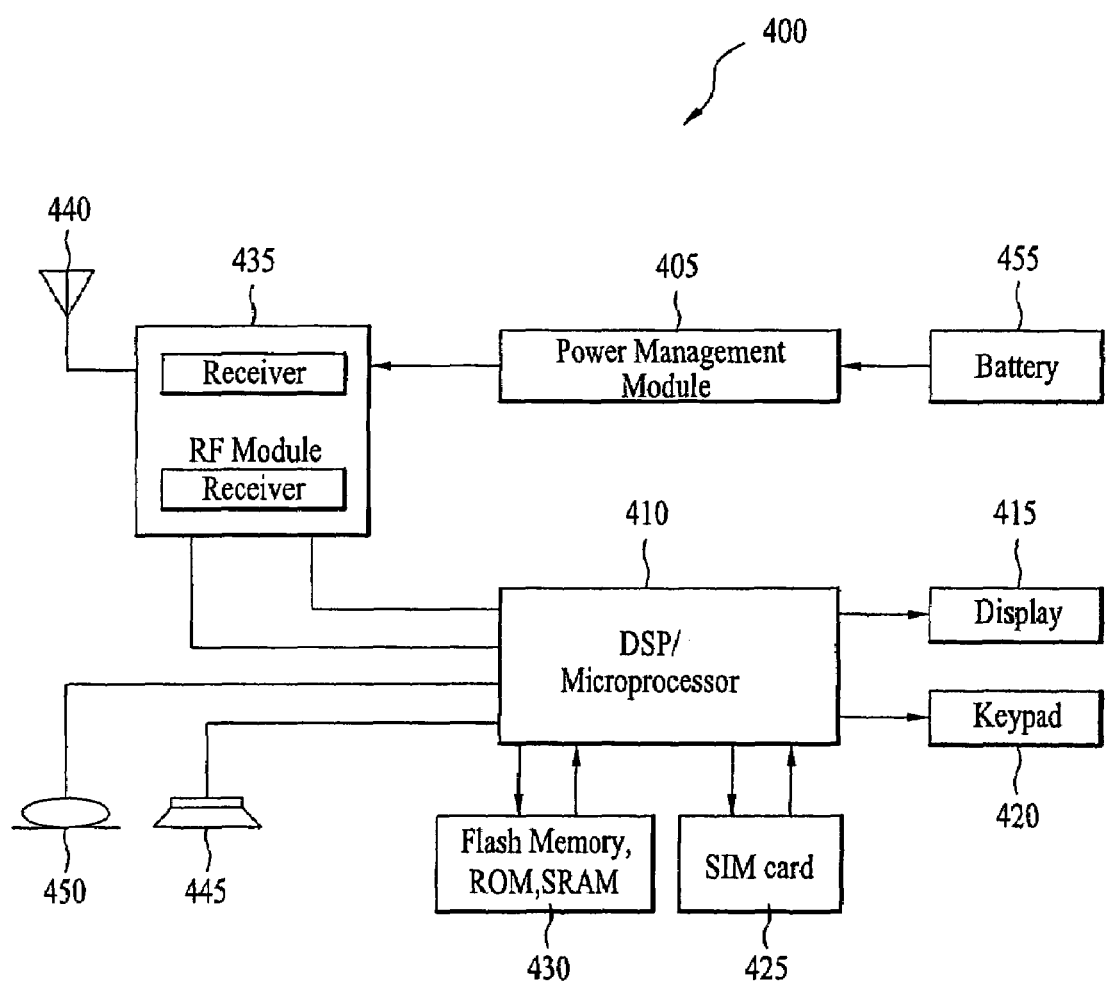
FIG. 7 illustrates a mobile communication device for receiving a point-to-multipoint service from a network according to one embodiment of the present invention.

Referring to FIG. 7, a block diagram of a mobile communication device 400 of the present invention is illustrated, for example a mobile phone for performing the methods of the present invention. The mobile communication device 400 includes a processing unit 410 such as a microprocessor or digital signal processor, an RF module 435, a power management module 405, an antenna 440, a battery 455, a display 415, a keypad 420, a storage unit 430 such as flash memory, ROM or SRAM, a speaker 445, a microphone 450, and, optionally, a SIM card 425.

A user enters instructional information, such as a telephone number, for example, by pushing the buttons of the keypad 420 or by voice activation using the microphone 450. The processing unit 410 receives and processes the instructional information to perform the appropriate function, such as to dial the telephone number. Operational data may be retrieved from the storage unit 430 to perform the function. Furthermore, the processing unit 410 may display the instructional and operational information on the display 415 for the user's reference and convenience.

The processing unit 410 issues instructional information to the RF section 435, to initiate communication, for example, by transmitting radio signals comprising voice communication data. The RF module 435 includes a receiver and a transmitter to receive and transmit radio signals. The antenna 440 facilitates the transmission and reception of radio signals. Upon receiving radio signals, the RF module 435 may forward and convert the signals to baseband frequency for processing by the processing unit 410. The processed signals may be transformed into audible or readable information output, for example, via the speaker 445.

In one embodiment of the mobile communication device 400, the RF module 435 and antenna 440 are adapted to receive first and second configuration type identifiers, the storage unit 430, or SIM CARD 425 if provided, is adapted to store the first and second configuration type identifiers and first second data communication parameters, and the processing unit 410 is adapted to utilize the first data communication parameters associated with the first configuration type identifier for the point-to-multipoint service, process the second configuration type identifier for the point-to-multipoint service associated with the second data communication parameters, compare the first configuration type identifier with the second configuration type identifier, and utilize the first data communication parameters to receive the point-to-multipoint service if the first configuration type identifier and the second configuration type identifier are identical.

In another embodiment of the mobile communication device 400, the RF module 435 and antenna 440 are adapted to receive a configuration type identifier, the storage unit 430, or SIM CARD 425 if provided, is adapted to store sets of data communication parameters and corresponding configuration type identifiers, and the processing unit 410 is adapted to process a configuration type identifier for the point-to-multipoint service, retrieve the set of stored data communication parameters associated with the received configuration type identifier and utilize the retrieved at set of data communication parameters to receive the point-to-multipoint service.

It will be apparent to one skilled in the art that the mobile communication device 400 may be readily implemented using, for example, the processing unit 410 or other data or digital processing device, either alone or in combination with external support logic.

Figure 8:
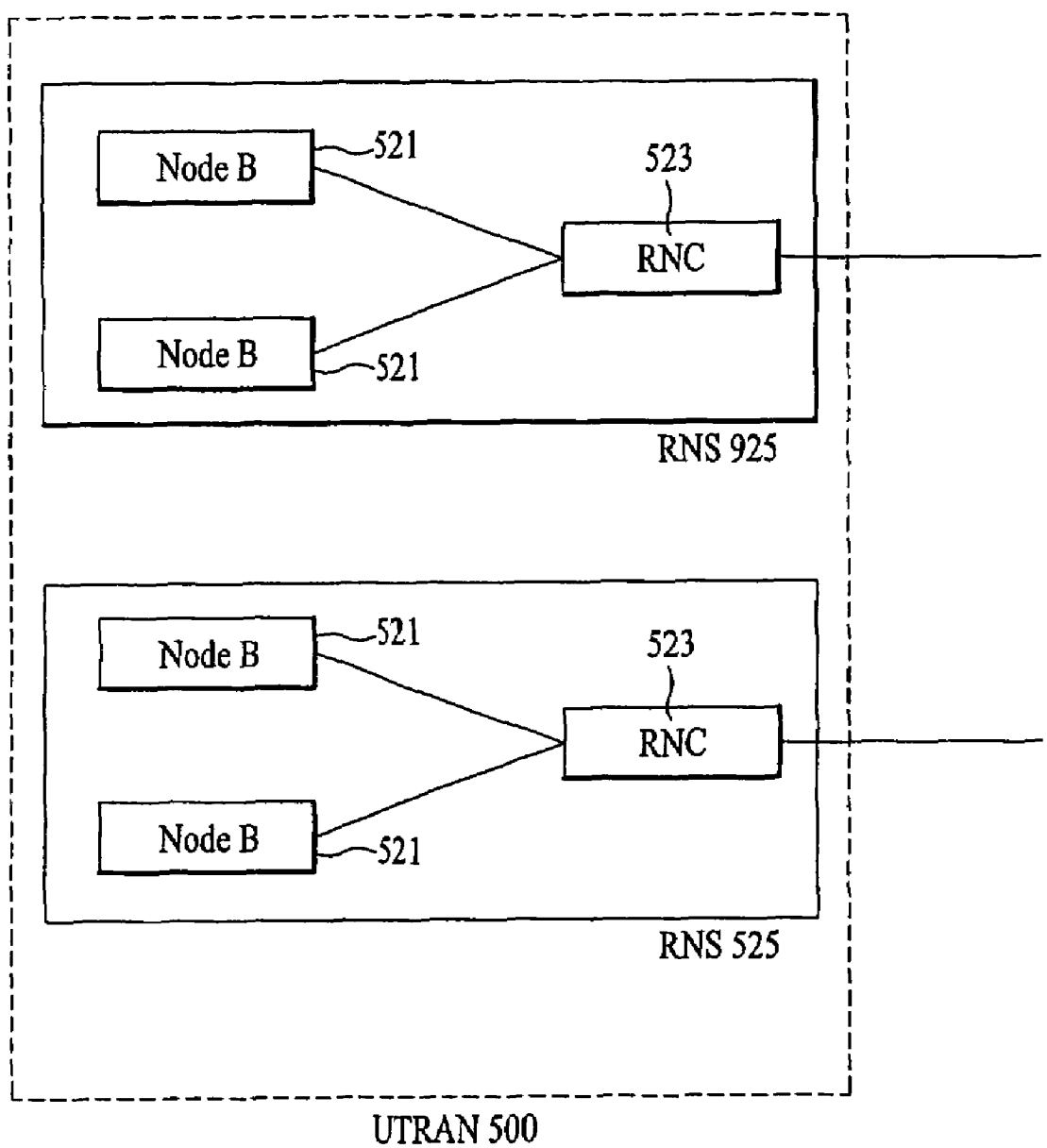
FIG. 8 illustrates a network for transmitting a point-to-multipoint service to a mobile terminal according to one embodiment of the present invention.

FIG. 8 illustrates a block diagram of a UTRAN 500 according to one embodiment of the present invention. The UTRAN 500 includes one or more radio network sub-systems (RNS) 525. Each RNS 525 includes a radio network controller (RNC) 523 and a plurality of Node-Bs 521, or base stations, managed by the RNC. The RNC 523 handles the assignment and management of radio resources and operates as an access point with respect to the core network 4. Furthermore, the RNC 523 is adapted to perform the methods of the present invention.

The Node-Bs 521 receive information sent by the physical layer of a mobile terminal 400 through an uplink and transmit data to the mobile terminal through a downlink. The Node-Bs 521 operate as access points, or as a transmitter and receiver, of the UTRAN 500 for the terminal 400.

In one embodiment of the UTRAN 500, the RNC 523 is adapted to transmit a configuration type identifier and associated data communication parameters to one or more mobile terminals 400 via Node-Bs 521 and the RNC 523 is adapted to utilize first data communication parameters associated with a first configuration type identifier to provide the point-to-multipoint service to the mobile terminals and transmit a second configuration type identifier associated with second data communication parameters for the same point-to-multipoint service to the mobile terminals.

In another embodiment of the UTRAN 500, the RNC 523 is adapted to transmit a configuration type identifier and associated data communication parameters to one or more mobile terminals 400 via Node-Bs 521 and the RNC 523 is adapted to store one or more sets of data communication parameters and corresponding configuration type identifiers, transmit a configuration type identifier for the point-to-multipoint service to the mobile terminals, retrieve the set of stored data communication parameters associated with the transmitted configuration type identifier, and utilize the retrieved set of data communication parameters to transmit the point-to-multipoint service to the mobile terminals.

The present invention enables different cells in a communication system in which a specific point-to-point service is provided to configure the radio protocol entities, channels, and radio bearer at the same time by utilizing the same parameter values, thereby minimizing delay in establishing a radio bearer and minimizing data loss occurring during handover, conserving network resources, and enhancing reception performance via soft combining. Furthermore, the present invention enables streaming broadcast services to be provided efficiently.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of present invention. Moreover, steps may be added to the above described logic and still conform to implementations of the invention.

It will be apparent to those skilled in the art that various modifications and various can be made in the present invention. Thus, it is intended that the present invention covers the modifications and variations of this invention provided they come within the scope of the appended claims and their equivalents.

What is claimed is:

1. A method of receiving a point-to-multipoint service in a mobile terminal, the method comprising:

receiving radio bearer configuration information from a first cell that is a current cell, wherein the radio bearer configuration information includes a radio bearer configuration identifier, radio protocol information and channel information;

receiving a first point-to-multipoint service from the first cell based on the radio bearer configuration information; and receiving a second point-to-multipoint service from a second cell that is a neighboring cell based on the radio bearer configuration information when the mobile terminal is served by the second cell, wherein the radio bearer configuration identifier is used to identify a radio bearer channel configuration established in the first cell.

2. The method of claim 1, wherein the radio bearer configuration information is transmitted periodically.

3. The method of claim 1, wherein the first point-to-multipoint service and the second point-to-multipoint service are MBMS (Multimedia Broadcast and Multicast Service).

4. The method of claim 1, wherein the radio bearer configuration information is received via a control channel.

5. The method of claim 4, wherein the control channel is an MBMS control channel (MCCH).

6. The method of claim 4, wherein the first point-to-multipoint service and the second point-to-multipoint service are received via an MBMS traffic channel (MTCH).

7. The method of claim 1, wherein the first point-to-multipoint service and the second point-to-multipoint service are different services.

8. The method of claim 1, wherein the first point-to-multipoint service and the second point-to-multipoint service are the same service.

9. The method of claim 1, further comprising receiving other radio bearer configuration information from the second cell.

10. The method of claim 1, wherein the radio protocol information includes radio interface protocols of packet data convergence protocol (PDCP) and radio link control (RLC) sublayers.

11. The method of claim 1, wherein the channel information includes at least one of logical channel information, physical channel information and transport channel information.

12. The method of claim 1, further comprising:
performing handover from the current cell to the neighboring cell.

13. A method of providing a point-to-multipoint service to at least one mobile terminal, the method comprising:

transmitting radio bearer configuration information to at least one mobile terminal in a current cell, wherein the radio bearer configuration information is periodically transmitted to the at least one mobile terminal and comprises a radio bearer configuration identifier, radio protocol information and channel information;

transmitting a first point-to-multipoint service to the at least one mobile terminal based on the radio bearer configuration information; and transmitting a second point-to-multipoint service to the at least one mobile terminal based on the radio bearer configuration information, wherein the first point-to-multipoint service and the second point to multipoint service are different services, wherein the radio bearer configuration identifier is used to identify a radio bearer channel configuration established in the current cell.

14. The method of claim 13, wherein the first point-to-multipoint service and the second point-to-multipoint service are MBMS (Multimedia Broadcast and Multicast Service).

15. The method of claim 13, wherein the radio bearer configuration information is transmitted via a control channel.

16. The method of claim 15, wherein the control channel is an MBMS control channel (MCCH).

17. The method of claim 16, wherein the first point-to-multipoint service and the second point-to-multipoint service are transmitted via an MBMS traffic channel (MTCH).

18. The method of claim 13, wherein the radio protocol information includes radio interface protocols of packet data convergence protocol (PDCP) and radio link control (RLC) sublayers.

19. The method of claim 13, wherein the channel information includes at least one of logical channel information, physical channel information and transport channel information.

20. A mobile communication device for receiving a point-to-multipoint service, the mobile communication device comprising:

an antenna adapted to receive radio bearer configuration information from a current cell and the point-to-multipoint service;

an RF module adapted to process the radio bearer configuration information and the point-to-multipoint service;

a keypad adapted for receiving information from a user;

a storage unit adapted to store packet data of the point-to-multipoint service and the radio bearer configuration information;

a display adapted to convey the packet data to the user; and a processing unit adapted to control the RF module to process the radio bearer configuration information for receiving the point-to-multipoint service, retrieve the packet data associated with the received the radio bearer configuration information and utilize the radio bearer configuration information to receive the point-to-multipoint service, wherein the radio bearer configuration information includes a radio bearer configuration identifier, radio protocol information and channel information and the radio bearer configuration identifier is used to identify a radio bearer channel configuration established in the current cell.

21. The mobile communication device of claim 20, wherein the radio bearer configuration information is transmitted periodically.

22. The mobile communication device of claim 20, wherein the point-to-multipoint service is an MBMS (Multimedia Broadcast and Multicast Service).

23. The mobile communication device of claim 20, wherein the radio bearer configuration information is transmitted via an MBMS control channel (MCCH).

* * * * *